(12) United States Patent
Shah

(10) Patent No.: US 8,806,040 B2
(45) Date of Patent: Aug. 12, 2014

(54) ACCESSING EXTERNAL NETWORK VIA PROXY SERVER

(75) Inventor: Amit Shah, Pune (IN)

(73) Assignee: Red Hat, Inc., Raleigh, NC (US)

(*) Notice: Subject to any disclaimer, the term of this patent is extended or adjusted under 35 U.S.C. 154(b) by 331 days.

(21) Appl. No.: 12/960,807

(22) Filed: Dec. 6, 2010

(65) Prior Publication Data

US 2012/0144050 A1    Jun. 7, 2012

(51) Int. Cl.
*G06F 15/16*      (2006.01)

(52) U.S. Cl.
USPC .............................................. 709/229; 726/8

(58) Field of Classification Search
USPC ........ 709/219, 229, 203, 202, 218; 726/8, 10, 726/12
See application file for complete search history.

(56) References Cited

U.S. PATENT DOCUMENTS

| | | | |
|---|---|---|---|
| 6,606,663 B1* | 8/2003 | Liao et al. ...................... | 709/229 |
| 2004/0103212 A1* | 5/2004 | Takeuchi et al. .............. | 709/245 |
| 2005/0114701 A1* | 5/2005 | Atkins et al. .................. | 713/201 |
| 2005/0125503 A1* | 6/2005 | Iyengar et al. ................. | 709/213 |
| 2005/0198380 A1* | 9/2005 | Panasyuk et al. .............. | 709/239 |
| 2006/0005237 A1* | 1/2006 | Kobata et al. .................... | 726/12 |
| 2006/0155721 A1* | 7/2006 | Grunwald et al. .............. | 707/100 |
| 2006/0235850 A1* | 10/2006 | Hazelwood et al. ............. | 707/9 |
| 2008/0072303 A1* | 3/2008 | Syed ............................... | 726/10 |
| 2009/0113532 A1* | 4/2009 | Lapidous .......................... | 726/7 |
| 2010/0138485 A1* | 6/2010 | Chow et al. .................... | 709/203 |
| 2011/0055912 A1* | 3/2011 | Fusari et al. ...................... | 726/8 |
| 2011/0106874 A1* | 5/2011 | Walsh et al. ................... | 709/202 |

* cited by examiner

*Primary Examiner* — Chi Pham
*Assistant Examiner* — Fahmida Chowdhury
(74) *Attorney, Agent, or Firm* — Lowenstein Sandler LLP

(57) ABSTRACT

A network manager establishes a network connection with a local area network (LAN) using a gateway device that interfaces the LAN with the Internet. A request is transmitted to the gateway device via the network connection to access a Web server of the Internet. A response page received from the Internet via the gateway device is examined to determine whether the response page is a redirect page, or if the response page is from a domain different from that was requested, from a Web proxy server that requires a user to log in, in order to access the Web server. It is determined whether credentials associated with the user required for the login page have been previously cached locally. The cached credentials of the user is automatically provided in response to the redirect page without user intervention to log into the Web proxy server, if it is determined that the credentials have been previously cached locally.

21 Claims, 4 Drawing Sheets

ACCESSING EXTERNAL NETWORK VIA PROXY SERVER

TECHNICAL FIELD

Embodiments of the present invention relate generally to accessing information of a network, and more particularly, this invention relates to accessing information of an external network via a proxy server.

BACKGROUND

Generally, a proxy server is a server that sits between a secure network, such as a corporate intranet, and a non-secure network, such as the Internet. It processes requests from computers on the intranet for access to resources on the Internet, while limiting or blocking access to the intranet from external computer systems. For efficiency purposes, it may in some cases attempt to fulfill these requests itself. In a typical proxy server implementation, the proxy server operates to filter requests for Web pages from the corporate intranet to the Internet. Web page requests are routed by the proxy server to the non-secure network and upon receipt of a requested Web page from the non-secure network, the proxy server forwards the Web page to the end user.

In other instances, a proxy server may serve as an authorization and/or authentication server to authenticate and/or authorize a particular user to enter a network. For example, a hotel chain may employ a corporate-wide Web proxy server that requires a customer to log in from a local area network (e.g., local wireless network of a particular hotel branch), in order to access an external network such as the Internet. Thus, whenever a customer logs into the local area network, an access to an external Web site will be redirected to the proxy server which prompts the customer to log in. In order to access the external network, the customer has to provide the necessary credentials such as a username and/or password for authentication and authorization purposes. After having successfully logged into the proxy server, the customer can then freely access the external network. Thus, every time a customer attempts to access the external network, the customer has to manually log into the proxy server by providing the necessary credentials. This may be done by hotels to charge customers for Internet access by the hour.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a network manager of a client machine of a local area network (LAN) is configured to cache the necessary credentials (e.g., username and/or password) that are required to log into a proxy server for the first time, in order to access an external network (e.g., Internet). Subsequently, when a user of the client machine attempts to log into the same proxy server in order to access the external network, the network manager automatically provides the cached credentials to log into the proxy server without user intervention. As a result, the user does not have to manually enter the credentials every time when accessing the same proxy server.

Figure 1:
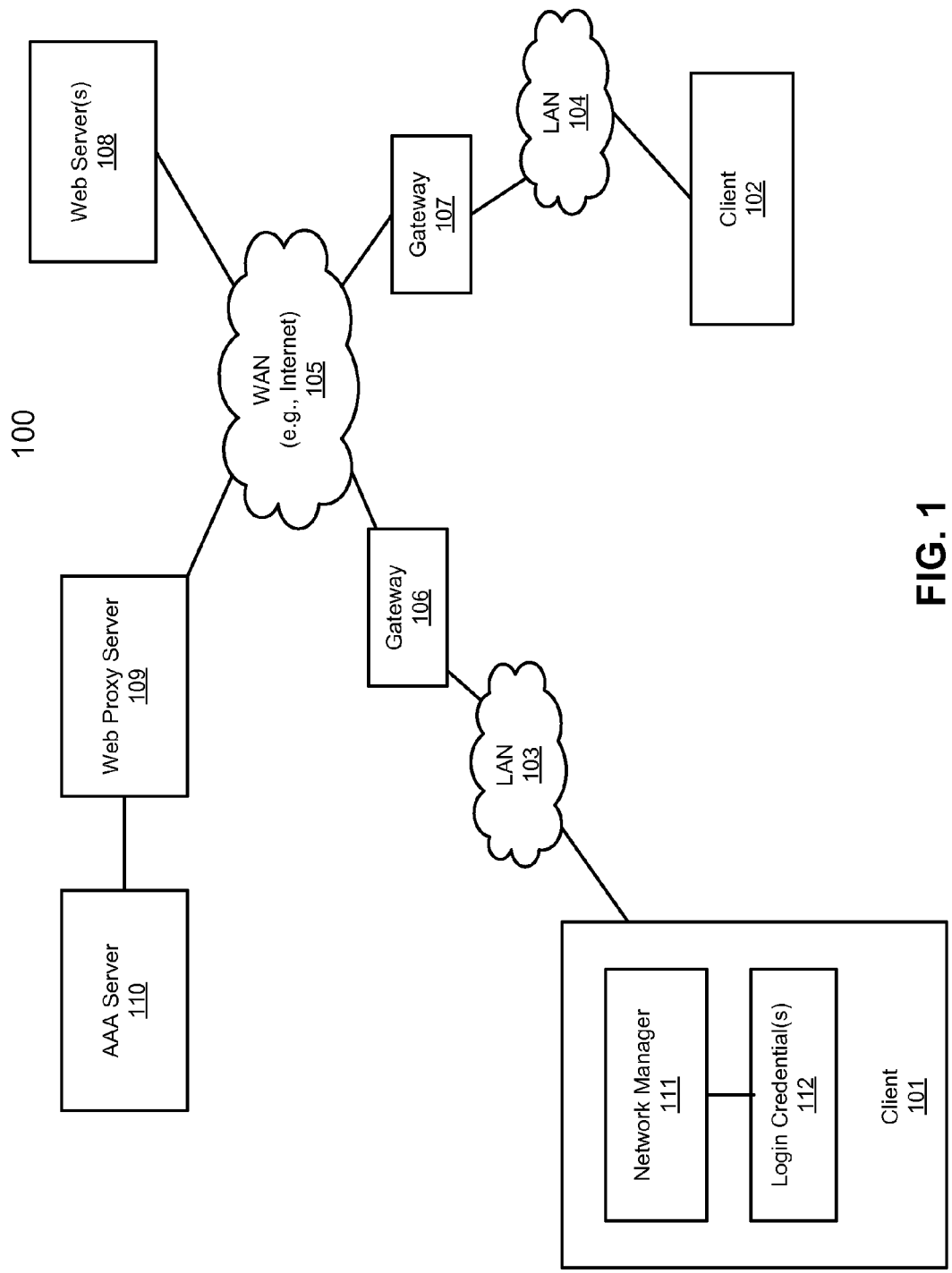
FIG. 1 is a block diagram illustrating a network system according to one embodiment of the invention.

FIG. 1 is a block diagram illustrating a network system according to one embodiment of the invention. Referring to FIG. 1, system 100 includes, but is not limited to, one or more clients 101-102 communicatively coupled to a wide area network (WAN) such as the Internet via their respective local area networks (LANs) 103-104, which are hosted and interfaced by gateway devices 106-107, respectively. Clients 101-102 can be any kind of electronic devices, such as, for example, desktops, laptops, mobile phones or smartphones, tablets, media players or gaming devices, etc. LANs 103-104 can be any kind of networks, such as wireless local networks (e.g., WiFi). Gateway devices 106-107 can be any kind of gateway devices, such as cable modems or digital subscribed line (DSL) modems.

Typically, in order to access external network 105 such as Internet, for illustration purpose, client 101 has to successfully enter or log into LAN 103 hosted by gateway device 106. For example, if LAN 103 is configured as a secure LAN, client 101 has to provide at least a password in order to log into LAN 103. Once client 101 successfully establishes a network connection with LAN, client 101 can access external network 105 via gateway device 106. In some situations, in order to access any Web sites of external network 105 such as Web servers 108, all traffic has to go through Web proxy server 109 for a variety of reasons. For example, the Internet access of client 101 may be provided by an Internet service provider (ISP). Sometimes such services are provided by the ISP based on a flat fee structure or alternatively, based on an amount of traffic or access time incurred. In order to track the network traffic associated with client 101, the ISP may configure gateway device or a dial-up Web portal (which may be the same as the proxy server) to redirect any outgoing traffic to a Web proxy server, in this example, Web proxy server 109, for authentication, authorization, and/or accounting (AAA) purposes, which may be handled by AAA server 110 associated with the ISP. Web server 108, web proxy server 109 and server 110 may be hosted by one or more computer devices.

In computer networks, a proxy server is a server (a computer system or an application program) that acts as an intermediary for requests from clients seeking resources from other servers. A client connects to the proxy server, requesting some service, such as a file, connection, web page, or other resource, available from a different server. The proxy server evaluates the request according to its filtering rules. For example, it may filter traffic by IP address or protocol. If the request is validated by the filter, the proxy provides the resource by connecting to the relevant server and requesting the service on behalf of the client. A proxy server may optionally alter the client's request or the server's response, and sometimes it may serve the request without contacting the specified server. In this case, it caches responses from the remote server, and returns subsequent requests for the same content directly.

Referring back to FIG. 1, in this configuration, gateway device 106 may be configured (e.g., by the associated ISP) to redirect any outgoing traffic from client 101 to Web proxy server 109, where proxy server 109 reroutes the traffic to the destination sites (e.g., Web servers 108). Similarly, when traffic is received from the destination sites, proxy server 109 may reroute the traffic to client 101. Thus, typically, every time client 101 attempts to access Web servers 108 of external network 105, client 101 has to access proxy server 109 and in response to a prompt from proxy server 109, has to provide the necessary credentials (e.g., username and/or password) in order to log into the proxy server 109. Such a process is typically a manual process that involves interaction from the user.

According to one embodiment, client 101 includes network manager 111 to cache the credentials (e.g., username and/or password) required to log into Web proxy server 109 and to store the credentials in a local storage (e.g., local non-volatile storage such as a hard drive) as part of login credentials 112. For example, after successfully logging onto LAN 103, when client 101 attempts accessing Web server 108 of external network 105 for the first time, the traffic will be redirected by gateway device 106 or the associated ISP to Web proxy server 109 that requires a user of client 101 to log in. After the user enters the necessary credentials on the login page of Web proxy server 109, network manager 111 is configured to capture the credentials and store the captured credentials in local storage (e.g., a secured storage location) as part of credentials 112.

In one embodiment, in response to a request received from a client application such as a browser application to access Web server 108, network manager 101 transmits the request to gateway device 106. When a response is received from gateway device 106, network manager 111 is configured to examine the response to determine whether the response is received from Web proxy server 109 or Web server 108. In one embodiment, network manager 111 may compare at least a portion of the addresses (e.g., universal resource locator/indicator or URL/URI links) of the request and the response to determine whether the response is received from Web proxy server 109. If the response has been received from the intended destination Web site, at least the domain of the addresses of the request and response should be similar or identical; otherwise, the response has been received from the proxy server. Once network manager 111 detects that client 101 is behind Web proxy server 109, network manager 111 is configured to monitor subsequent communications between the client application and Web proxy server 109 to capture or extract from the communications the credentials that are required to log into Web proxy server 109. It is important to note there could be multiple Web proxies—e.g., for people traveling lots, they will come across multiple airport web proxies and multiple hotel web proxies. Network manager 111 can be configured to identify which Web proxy has replied to requests and log into the web proxy depending on the response received.

Subsequently (e.g., after reboot), when client 101 attempts accessing external network 105 again, the traffic may be redirected to Web proxy server 109 for login. In this situation, since the required credentials for logging into Web proxy server 109 have been cached locally within client 101 (e.g., credentials 112), such credentials can be automatically provided by network manager 111 to Web proxy server 109 without user intervention. As a result, the user does not have to manually re-enter the necessary credentials for logging into Web proxy server 109. It is assumed that credentials 112 may be stored in a secured storage location for security reasons. In some situations, users also may not want to store credentials permanently—in this case, network manager 111 could show a prompt to enter username/password details. In such a case, network manager 111 would identify it is getting responses from a known web proxy, but does not have any credentials cached, so it will just prompt the user for login info.

The techniques described above can be applied to a variety of situations. For example, a user of client 101 may travel among multiple locations and each location has its own local area network such as local WiFi networks. The user may stay in multiple hotel locations of the same hotel chain, where the hotel chain has a corporate Web Proxy server. In this example, it is assumed that LAN 103 is associated with a first hotel location of a particular hotel chain and LAN 104 is associated with a second hotel location of the same hotel chain, where the hotel chain has a corporate Web proxy Server 109. From any of LANs 103 and 104, a client has to go through Web proxy server 109 in order to access any site of external network (e.g., Internet) 105 such as Web servers 108.

According to one embodiment, when client 101 accesses Web servers 108 of external network 105 from LAN 103 of the first hotel location, the network traffic is redirected to Web proxy server 109 of the hotel chain. After the user of client 101 has entered the required credentials for logging into Web proxy server 109, network manager 111 of client 101 caches the credentials in local storage as part of credentials 112. Subsequently, when client 101 travels to a second hotel location as client 102, after successfully logging into LAN 104, the network traffic of client 102 is redirected to Web proxy server 109 for login purposes. In this situation, since the credentials required to log into the same Web proxy server have been cached within client 102, such credentials are then automatically provided by the network manager to log into Web proxy server 109 without user intervention or knowledge. Also note that previously-used credentials may no longer work. For example, if a user paid for 10 hours of internet usage at a first hotel location, and after those 10 hours have lapsed, the user goes to a second hotel location, the credentials may not work. A new dialog box may be displayed and the user may have to enter a new set of credentials.

Note that if the local network has been configured as a secured local network, there may be an additional login for entering the local network, prior to the login of the Web proxy server. For example, if LAN 103 has been configured as a secured local network that requires first credentials (e.g., password) to login in order to enter LAN 103, client 101 is required to provide at least the first credentials in order to connect with LAN 103. Only after having successfully entered LAN 103, client 101 can then access external network 105. In order to access Web servers 108 of external network 105, client 101 may be required to provide second credentials (e.g., username and/or password) in order log into Web proxy server 109. In one embodiment, one or both of the first and second credentials may be cached as part of credentials 112 within client 101. Also note that, in certain hotels, there may be free access of Internet for participates of a business conference, where each participate can enter a conference identifier and/or a passcode (e.g., daily passcode), instead of individual username and password.

Figure 2:
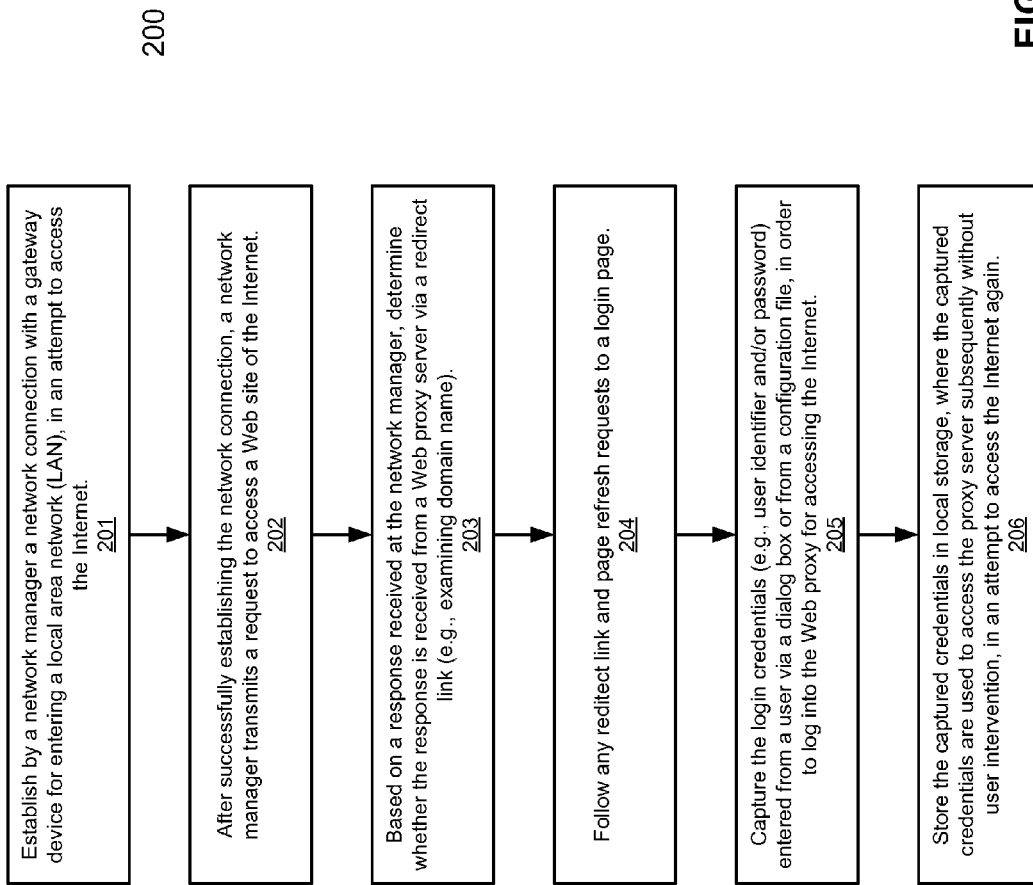
FIG. 2 is a flow diagram illustrating a method for authenticating users via a proxy server according to one embodiment of the invention.

FIG. 2 is a flow diagram illustrating a method for authenticating users via a proxy server according to one embodiment of the invention. For example, method 200 may be performed by network manager 111 of FIG. 1. Referring to FIG. 2, at block 201, a network manager of a client machine establishes a network connection with a gateway device of a local network in an attempt to access an external network such as Internet. If the local network has been configured as a secure network, it may require the client machine to provide required credentials such as a password for entering the local network. After successfully entering the local network, at block 202, the network manager receives a request received from a client application such as a browser application to access a Web site of the external network and transmits the request to the gateway device. At block 203, based on a response received from the gateway device, the network manager determines whether the response was received from a Web proxy server via a redirect link. In one embodiment, the network manager may examine the domain name of the Web page to determine whether the response has been received from a Web proxy server. If the domain name of the received page is not identical to the intended domain name, the page may be received from a proxy server. Note the redirect link may be absent from some web proxy responses. In this case, the Web proxy just shows the login page as the response to the client's request. Various Web proxies can use various means of showing the login page. Redirect pages can be used to show some messages from the ISP (e.g., advertisements or 'Please wait while you are redirected' message). The login page typically prompts the user to enter the necessary credentials to log into the proxy server. At block 204, the network manager follows any redirect link and page refresh requests to a login page, which causes a dialog box to be displayed at the client to prompt the user entering a user identifier and/or password. At block 205, the network manager captures the credentials entered by the user in order to log into the proxy server. In one embodiment, the credentials may be previously configured or stored in a configuration file. At block 206, the captured credentials may then be stored in a local storage for future automatic login of the proxy server without user intervention. Also note that the login information may be captured dependent on user preferences. For example, first time the authentication is done, the dialog box could have a check box where the user selects whether or not to store login info for future automatic authentication.

Figure 3:
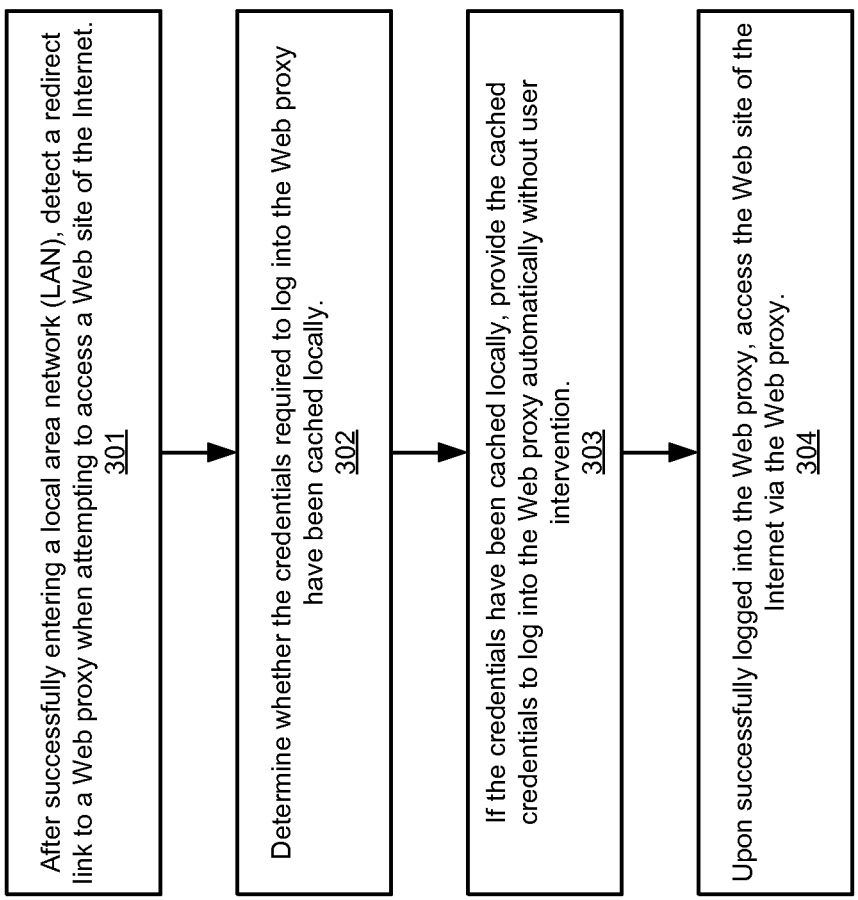
FIG. 3 is a flow diagram illustrating a method for authenticating users via a proxy server according to another embodiment of the invention.

FIG. 3 is a flow diagram illustrating a method for authenticating users via a proxy server according to another embodiment of the invention. For example, method 300 may be performed by network manager 111 of FIG. 1. Referring to FIG. 3, at block 301, after successfully entering a local network, network manager 111 detects a redirect link to a Web proxy server when a client application attempts to access a Web site of the Internet. Or, a response from a domain different than what was requested. Typically, the Web proxy server prompts the user to enter the necessary credentials (e.g., username and/or password) to log into the Web proxy server, in order to access other Web sites on the Internet. At block 302, it is determined whether the required credentials associated with the proxy server have been previously cached locally. If so, at block 303, processing logic automatically retrieves the credentials from the local storage and provides the credentials to log into the proxy server. At block 304, upon successfully logging into the proxy server, the client application can access the Internet via the proxy server.

Note that the techniques described above are not limited to Web servers or Web proxies. They can also be applied to other configurations. According to other embodiments, the techniques described above can be applied to any proxies that block all sorts of requests except DNS queries and redirect to a proxy server for authentication. For example, the techniques described above can be applied to file transfer protocol (FTP) servers.

Figure 4:
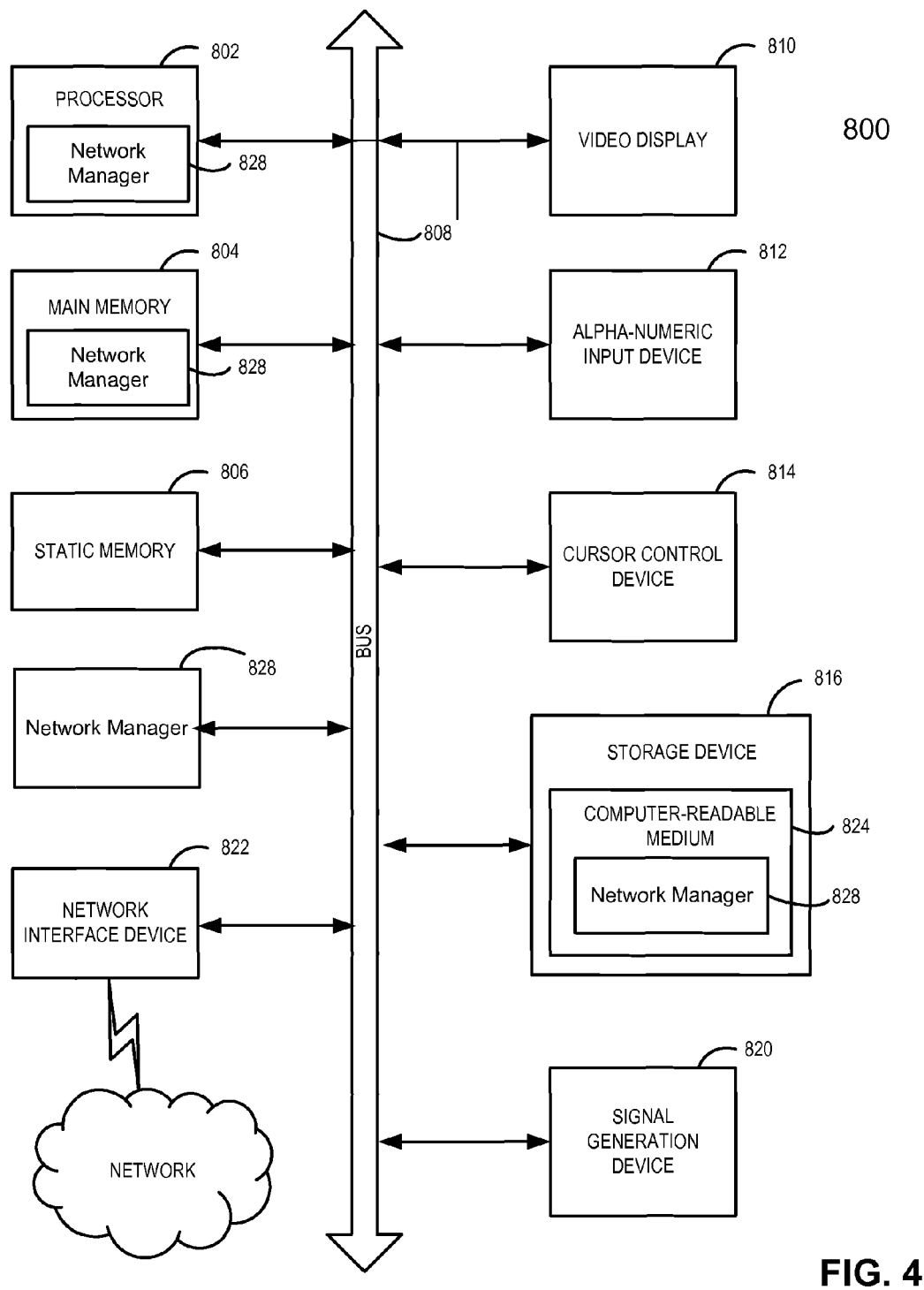
FIG. 4 illustrates a data processing system which may be used with an embodiment of the invention.

FIG. 4 illustrates a data processing system which may be used with an embodiment of the invention. For example, system 800 may represent a client system and/or a server as described above. Referring to FIG. 4, system 800 may present a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., network manager 828) embodying any one or more of the methodologies or functions described herein. The network manager 828 may also reside, completely or at least partially, within the main memory 804 and/or within the processor 802 during execution thereof by the computer system 800, the main memory 804 and the processor 802 also constituting machine-accessible storage media. The network manager 828 may further be transmitted or received over a network via the network interface device 822.

The computer-readable storage medium 824 may also be used to store the desktop 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
sending, from a browser application at a client device, a first request to access a web server residing in a first domain of a domain name system and, in response, receiving a first response;
determining, by a network manager executed by a processor at the client device, that the first response comprises a link that redirects the first request to a proxy server and, in response, extracting the link from the first response;
sending a second request to the proxy server in view of the link and, in response, receiving a second response from the proxy server;
determining, by the network manager, that the second response comprises a login page and that the proxy server resides in a second domain of the domain name system;
determining, by the network manager, that the first domain of the web server is different than the second domain of the proxy server;
in response to determining that the second response comprises the login page and that the first domain of the web server is different than the second domain of the proxy server, determining that first credentials associated with the login page have been previously cached at the client device; and
providing the first credentials from the client device to the proxy server, without user intervention, for access to the web server.

2. The method of claim 1, further comprising:
prompting a user for the first credentials in response to determining that the first credentials have not been previously cached at the client device;
and
caching the first credentials at the client device.

3. The method of claim 2, wherein the first credentials include at least one of a user identifier or a password.

4. The method of claim 3, wherein the first credentials are stored at the client device in a configuration file.

5. The method of claim 4, wherein the configuration file further stores other credentials required to log into other proxy servers.

6. The method of claim 1, further comprising establishing a network connection by providing second credentials to log into a network that provides access to the web server and the proxy server.

7. The method of claim 1, wherein the network is a local area network (LAN).

8. A non-transitory computer-readable storage medium having instructions stored therein that, when executed by a processor, cause the processor to perform operations comprising:
- sending, from a browser application at a client device, a first request to access a web server residing in a first domain of a domain name system and, in response, receiving a first response;
- determining, by a network manager executed by the processor at the client device, that the first response comprises a link that redirects the first request to a proxy server and, in response, extracting the link from the first response;
- sending a second request to the proxy server in view of the link and, in response, receiving a second response from the proxy server;
- determining, by the network manager, that the second response comprises a login page and that the proxy server resides in a second domain of the domain name system;
- determining, by the network manager, that the first domain of the web server is different than the second domain of the proxy server;
- in response to determining that the second response comprises the login page and that the first domain of the web server is different than the second domain of the proxy server, determining that first credentials associated with the login page have been previously cached at the client device; and
- providing the first credentials from the client device to the proxy server, without user intervention, for access to the web server.

9. The computer-readable storage medium of claim 8, wherein the operations further comprise:
- prompting a user for the first credentials in response to determining that the first credentials have not been previously cached at the client device;
and
- caching the first credentials at the client device.

10. The computer-readable storage medium of claim 9, wherein the first credentials include at least one of a user identifier or a password.

11. The computer-readable storage medium of claim 10, wherein the first credentials are stored at the client device in a configuration file.

12. The computer-readable storage medium of claim 11, wherein the configuration file further stores other credentials required to log into other proxy servers.

13. The computer-readable storage medium of claim 8, wherein the operations further comprise establishing a network connection by providing second credentials to log into a network that provides access to the web server and the proxy server.

14. The computer-readable storage medium of claim 9, wherein the network is a local area network (LAN).

15. A system, comprising:
- a processor at a client device to execute a browser application to:
  - send a first request to access a web server residing in a first domain of a domain name system and, in response, receive a first response;
- wherein the processor is further to execute a network manager to:
  - determine that the first response comprises a link that redirects the first request to a proxy server and, in response, extract the link from the first response;
  - send a second request to the proxy server in view of the link and, in response, receive a second response from the proxy server;
  - determine that the second response comprises a login page and that the proxy server resides in a second domain of the domain name system;
  - determine that the first domain of the web server is different than the second domain of the proxy server;
  - in response to the determination that the second response comprises the login page and that the first domain of the web server is different than the second domain of the proxy server, determine that first credentials associated with the login page have been previously cached at the client device; and
  - provide the first credentials from the client device to the proxy server, without user intervention, for access to the web server.

16. The system of claim 15, wherein the network manager is further to:
- prompt a user for the first credentials in response to determining that the first credentials have not been previously cached at the client device;
and
cache the first credentials at the client device.

17. The system of claim 16, wherein the first credentials include at least one of a user identifier or a password.

18. The system of claim 17, wherein the first credentials are stored at the client device in a configuration file.

19. The system of claim 18, wherein the configuration file further stores other credentials required to log into other proxy servers.

20. The system of claim 15, wherein the network manager is further to establish a network connection by providing second credentials to log into a network that provides access to the web server and the proxy server.

21. The system of claim 15, wherein the network is a local area network (LAN).

* * * * *